March 20, 1962     N. R. HENRY     3,025,920

BATCH WEIGHING APPARATUS

Filed June 22, 1956     3 Sheets-Sheet 1

INVENTOR.
NELSON R. HENRY
BY
ATTORNEY

March 20, 1962 N. R. HENRY 3,025,920
BATCH WEIGHING APPARATUS
Filed June 22, 1956 3 Sheets-Sheet 2
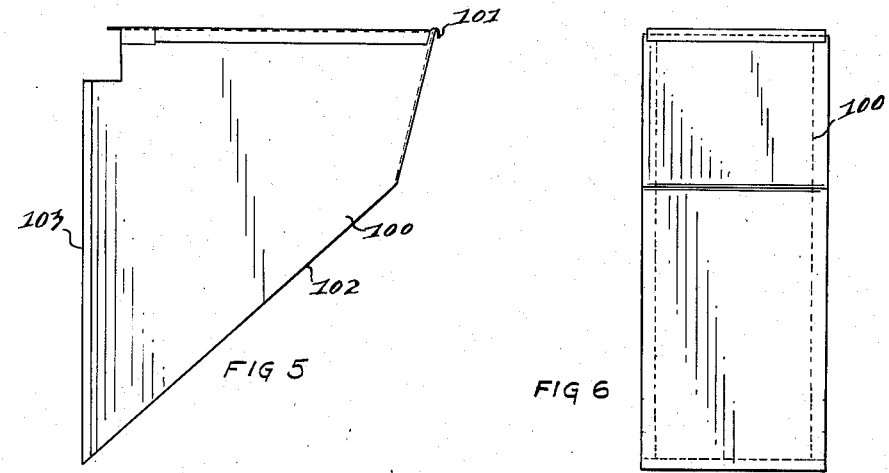
FIG 5  FIG 6
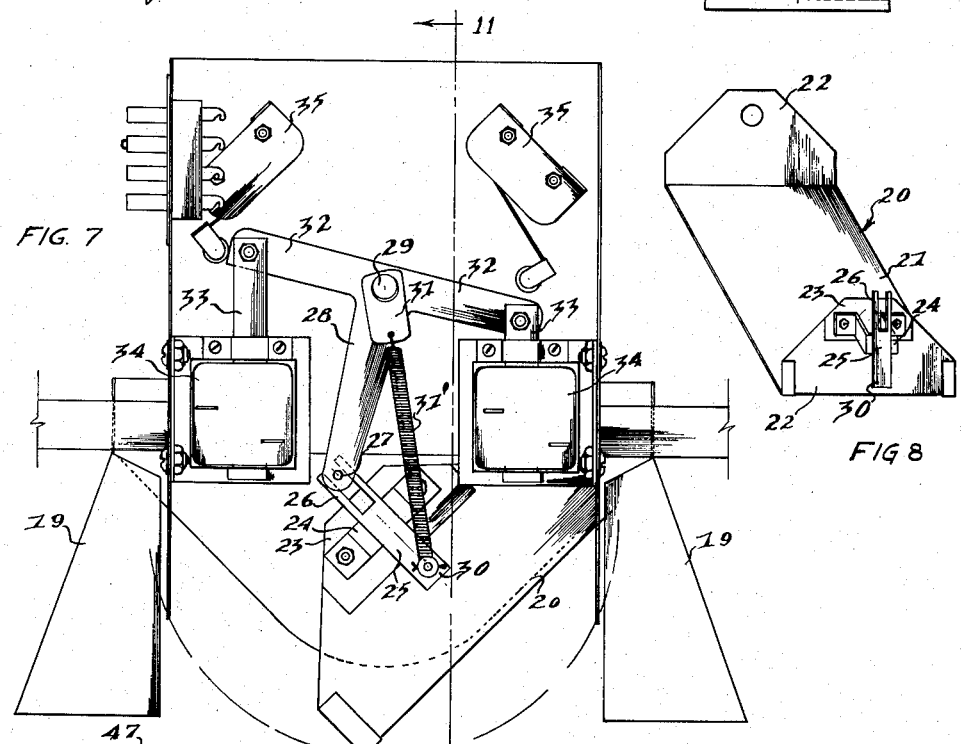
FIG. 7  FIG 8
INVENTOR.
NELSON R. HENRY
BY
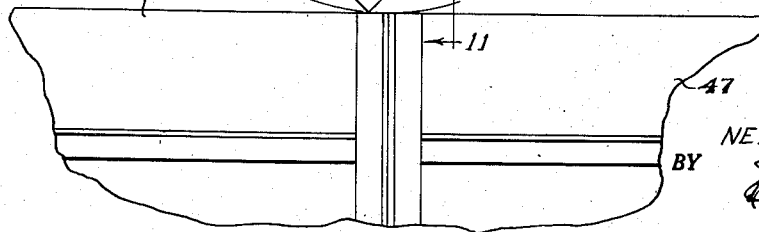
ATTORNEY March 20, 1962 N. R. HENRY 3,025,920
BATCH WEIGHING APPARATUS
Filed June 22, 1956 3 Sheets-Sheet 3

INVENTOR.
NELSON R. HENRY
BY
ATTORNEY

United States Patent Office 3,025,920
Patented Mar. 20, 1962

3,025,920
BATCH WEIGHING APPARATUS
Nelson R. Henry, Decatur, Ga., assignor to The Woodman Company, Inc., Decatur, Ga., a corporation of Georgia
Filed June 22, 1956, Ser. No. 593,285
5 Claims. (Cl. 177—99)

This invention relates to weighing apparatus and is more particularly concerned with the batch weighing and loading of materials. While certain aspects of the present inventive concept may be generally applied and are broadly applicable to various types of weighing and/or delivery mechanisms, the present device as here presented by way of example is admirably suited for the batch weighing and delivery of light, fragile materials such as potato chips.

In the highly developed art of weighing equipment for the automatic and successive weighing of batches of material, various types of apparatus particularly designed for such light and frangible materials have been developed. It is common in such equipment to provide for the delivery of material to a weighing hopper located on or in weight reflecting relation to a scale mechanism in such manner as to terminate the supply of material to the hopper when predetermined weight thereof has been received and to deliver such weighed batch to suitable packaging means. However, in the operation of such devices, considerable time is lost in the necessity for the periodic feed of material which must be cut off when the appropriate weight of material has been received by the hopper and must remain in non-feeding condition until the delivery of the weighed batch has been completed. Such periodic feed is not only time consuming but in the starting and terminating of such feed a danger exists with respect to the fracturing of the frangible materials, such as potato chips. Since it is understood that one of the primary objects to be achieved by automatic batch weighing devices of the character described is the economy of time, it will be obvious that such periodic operations of the loading device defeat this objective. In such apparatus, the total time elapsed between cycles is not only prolonged to the necessity for intermittent feeding but delivery is also time consuming. A further difficulty with respect to apparatus of the prior art has been with respect to the adjustment of varying batch weights. While weight adjustments may readily be made, problems have arisen with respect to conversion of such weighing apparatus from one batch to another where the weight and/or bulk ranges are substantial. In view of the fact that in the adjustment of a single apparatus from one to another size or weight of batch, where a single hopper is utilized not only do losses occur and the margin of accuracy diminishes as large hoppers are used for the weight batching of small increments, but where light and delicate material such as potato chips are used the time length of drop of such material to reach the discharge is of course greater where only small batches are utilized and where the hopper has a capacity adequate for much greater batches.

It is, therefore, among the primary general objects of the present invention to provide a novel and improved apparatus of the character described for the efficient and effective rapid batch weighing and discharging of material.

More specifically, it is among the objects of the present invention to provide a novel and improved apparatus of the character described particularly adapted for the handling of frangible light material such as potato chips and by which such handling may be maintained expeditiously and with a minimum of damage to the materials.

Another object of the present invention is to provide a batch weighing machine by which a continuous supply of material may be maintained, thus avoiding the necessity for periodic termination of the feed and hence the consequent time consumption and damage to materials.

It is also among the objects of the present invention to provide apparatus of the character described admirably adapted for the batch weighing and delivery of widely varying increments of the material and to provide for such variation without danger of increasing the loss of materials due to damage.

The objects of the present invention also include that of providing means whereby the normal weight batches may be delivered in multiples to a receptacle without material change in the setting of the apparatus by convenient and readily manipulated control mechanisms.

Numerous other objects, features and advantages of the present invention will be apparent from consideration of the following specification taken in conjunction with the accompanying drawings in which:

FIG. 5 is a still further enlarged side elevation of an insert designed to provide for a diminishment of the batches to be weighed and delivered.

FIG. 6 is a rear elevation of the insert of FIG. 5.

FIG. 7 is a detailed fragmentary vertical cross-section taken on line 7—7 of FIG. 1.

FIG. 8 is a detailed perspective view of diverter.

While, as has been suggested, various aspects of the present invention may well be adapted for application to a wide variety of weighing mechanisms, the invention as here presented by way of illustration is particularly adapted for the batch weighing and discharging of light frangible or flaky material, such as potato chips. The present form of the invention may be generally characterized as comprising a feed hopper provided with a periodically operable oscillating diverter gate by which continuously flowing material may be successively directed to one or the other of two weighing compartments associated through weight responsive means with a scale mechanism. Each compartment has an individually operable closure which may be opened to discharge the contents thereof independently of the contents of the other compartment. In operation, the supplied material is directed first to one compartment until the weight thereof is such as to over-balance the setting of the weight responsive mechanism whereupon means are provided for shifting the diverter gate to deliver the continuously supplied material to the opposite compartment while simultaneously opening the discharge closure of the first compartment to permit the discharge of material therefrom while the second compartment is being loaded. It is thus possible to provide for the continuous feeding of material and the weighing of one batch while a companion batch is being supplied to a chamber formed integrally with the first chamber and in weight relation to the weight responsive mechanism. An important feature of the invention is the means by which wide variations in the batches to be segregated and discharged may be achieved without undue loss of time through long vertical drops of the material. This is achieved by the use of inserts in the weighing compartments, which inserts may be readily installed and removed and which, in conjunction with adjustment of the weight responsiveness and associate control means, provide for the diminishment of the size of the chamber and thus the efficiency of the apparatus may be greatly improved over that wherein adjustment for small batches is achieved solely by a change in the weighing mechanism and its responsive control devices.

Figure 1:
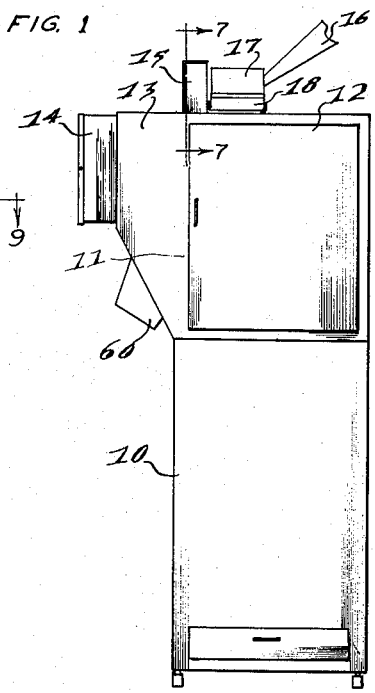
FIG. 1 is a side elevation of one form of the present invention showing the supporting cabinet therefor.
Figure 3:
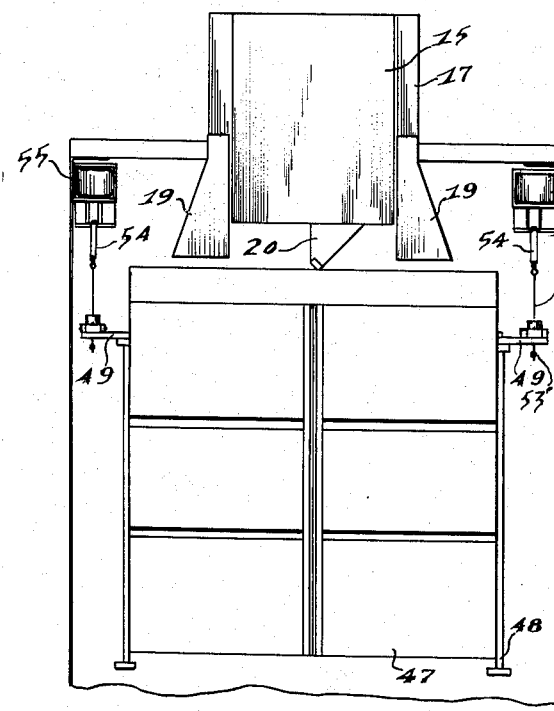
FIG. 3 is a vertical sectional view taken along the line 3—3 of FIG. 2.
Figure 4:
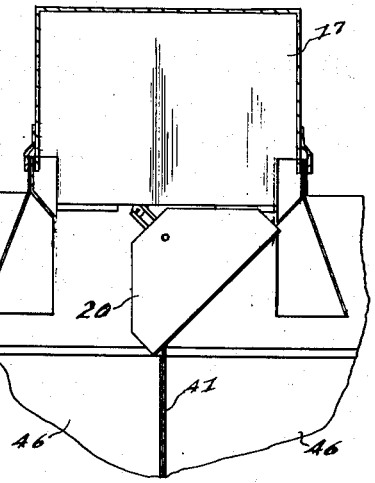
FIG. 4 is a vertical cross sectional view of the feed control and diverter mechanism taken on the line 4—4 of FIG. 2.
Figure 9:
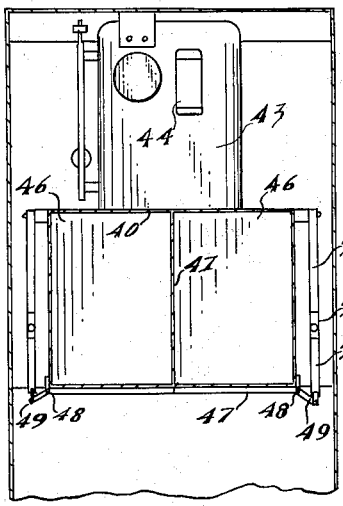
FIG. 9 is a horizontal cross-section taken on the line 9—9 of FIG. 2.

Referring now to FIG. 1 of the drawings, it will be seen that in that preferred form of the invention herein presented as for the weighing and discharging of batches of light frangible material such as potato chips, the structure comprises a cabinet generally indicated by the numeral 10, the lower, portion of which supports the batching structure at an appropriate height to provide for the disposition thereunder of suitable receptacle presenting mechanisms. The present invention contemplates the use of a periodically indexing rotary holder (not shown) by which successive bags or receptacles are presented to the delivery chute. In the present structure, the numeral 11 indicates the upper housing which is superposed on the lower cabinet 10 and which may be designated as a superstructure enclosing the batch weighing mechanism.

The housing 11 is substantially rectangular in form, being provided with a hingedly mounted side door 12 and a forwardly projecting portion 13 protruding beyond the front face of the supporting cabinet 10. On the forward face of the portion 13, there is mounted an electrical control box 14 and a housing 15 is mounted to extend upwardly from the superstructure to enclose the diverter gate control mechanism shown in FIGURE 7. The potato chips or equivalent frangible material to be weighed and delivered in batches from the apparatus may be suitably supplied through a supply trough 16, the construction and operation of which forms no part of the present invention. The mouth of the trough 16 delivers the material to a hopper 17 here shown as generally rectangular in form and defined by vertical side walls, a closed top, open at bottom and open at the rear side to receive the trough 16. At the open lower end of the hopper 17 and transversely mounted for pivotal movement thereacross, there is provided a pivotally mounted diverter gate 20 as shown in detail in FIG. 8. The hopper 17 is mounted upon the upwardly extending flanges 18 of outwardly flaring guide wings 19 by which the material is directed to the chambers below. The gate 20 comprises a flat generally rectangular transverse body 21 and vertical end members 22. The end members are of frusto-triangular formation and are disposed in planes normal to the plane of the body 21. On one of the ends 22, there is mounted a plate 23 adapted to receive a bracket as indicated in FIGS. 7 and 8 at 24 upon which is fixedly mounted an operating bar 25. It will be understood that in the operation of the device, the gate 20 is adapted to be moved from one inclined position substantially 45° with respect to the vertical to an opposite inclined position of equal angularity. As shown in FIG. 7, the diverter gate is disposed in a left inclined position whereby material deposited through the hopper will be deflected to the left side. After appropriate weighing operations as will be hereinafter discussed, the gate is moved to an oppositely inclined position whereby material fed through the hopper will be delivered to the right side of FIG. 7.

The upwardly and outwardly extending end 26 of the operating bar 25 is furcated to receive between the furcations thereof a pin 27 carried by the lower extremity of the arm 28 of a pivotally mounted double bell crank centrally pivoted as at 29. The lower end 30 of the operating bar 25 has secured thereto a spring 31, the upper end of which is mounted from a bracket 31 pivotally supported with the double bell crank. The oppositely extending arms 32 of the bell crank are each engaged by plungers 33 of a pair of oppositely disposed diverter solenoids indicated at 34, the arrangement being such that upon energization of the right or left-hand solenoid 34, the right or left-hand arms 32, respectively, of the bell crank will be moved downwardly, thus oscillating the arm 28 whereby its pin 27 in engagement with the furcated end 26 will cause the diverter gate to oscillate from one to the other of the positions referred to. Mounted above and adjacent the ends 32 of the double bell crank are switches 35 so arranged as to be engaged by whichever arm 32 is uppermost, thus closing circuits which will be further discussed in connection with the discussion of the electrical diagram of FIG. 12.

Mounted directly below the hopper 17 and the gate 20 there is provided the double compartmented weighing means generally indicated by the numeral 40, the means 40 is of generally rectangular cross-section being provided with a central vertical partition 41 by which it is divided into equal and opposite vertical chambers to which the material is supplied alternately in response to the alternate inclined positions of the diverter gate 20. This means 40 is balanced as indicated at 42 upon the scale beam of a conventional weighing apparatus indicated at 43 which includes a visual weight indicating mechanism 44 and electrical contact means indicated at 45 which is further discussed in connection with the circuit shown in FIG. 12. The vertical parallel compartments indicated by the numeral 46 are each provided with a vertical front pivotally mounted closure or door 47, each such closure is mounted on a vertical ringe rod 48 and each closure is provided with a rigidly secured outwardly extending operating bracket 49. The door operating mechanism includes the pivotally joined forward and rear links 50 and 51 hingedly united at 53. Through the rear of link 51, there extends a flexible operating cord 52 having an abutment element 53' at the lower end thereof below the arm 51. The upper end of the flexible element 52 is secured as by a lever 54 to an operating solenoid 55 upon energization of which the element 53' is raised causing pivotal movement between the arms 50 and 51, thus shortening the distance between the secured ends thereof and hence pivotally moving the door through the connection of the bracket 49 with the link 50 and thereby opening the door of that compartment with which the energized solenoid is associated.

Figure 10:
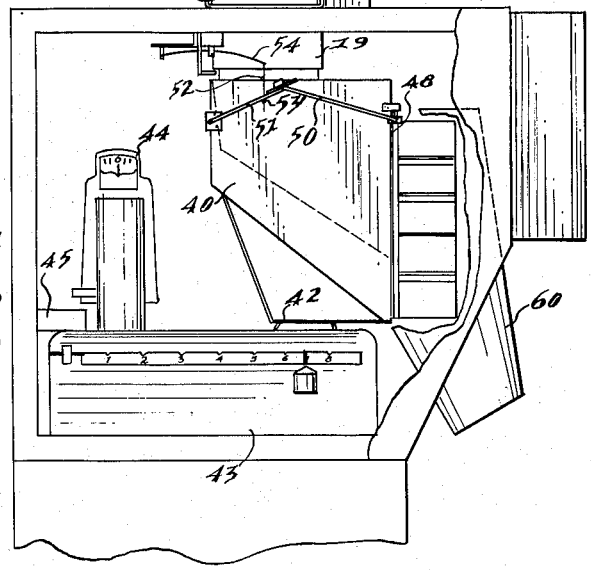
FIG. 10 is a side elevation partly broken away showing one of the discharge doors open.
Figure 11:
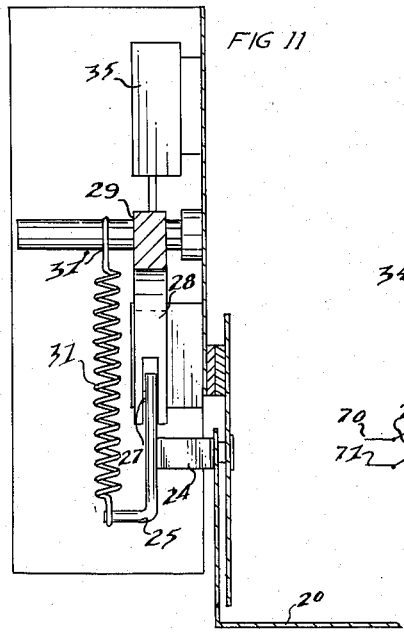
FIG. 11 is a vertical detail cross-sectional taken on line 11—11 of FIG. 7.

In more detail, the forward end of the forward link 50 of the toggle arrangement described above is swivelly connected to the outer end of operating bracket 49 while the rearward end of rear link 51 is hingedly secured for pivoting in a vertical plane to means 40 so that when door 47 is closed, the links 50 and 51 lie in about a horizontal plane. If however, link 51 is lifted, rear link 51 pivots upwardly about its hinged connection to means 40. Since forward link 50 is hingedly united at numeral 53, the forward and rear links 50 and 51 upon movement of link 51 tend to jackknife upwardly to the position shown in FIG. 10 and therefore the link 50 urges the end of bracket 49 rearwardly, which causes pivoting of door 47 about hinge rod 48. Upon releasing of link 51, the toggle arrangement returns by gravity to the position shown in FIG. 2, the weight of the hinged union at numeral 53 urging the links 50 and 51 to a horizontal position to thereby urge the outer end of bracket 49 forwardly and cause the door 47 to swing closed. For pivoting link 51 upwardly, there is provided a flexible operating cord 52 which extends through an aperture in link 51. The aperture in link 51 is sufficiently large that the cord 52 will freely slide therein. Below the link 51 an abutment element 53' is provided, the abutment element 53' being larger than the aperture in link 51 so that when the cord 52 is raised, the cord 52 passes upwardly through the aperture in link 51 until the abutment element 53 engages the lower surface of link 51. Further upward movement of cord 52 will cause link 51 to be pivoted upwardly as shown in FIG. 10. Upon downward movement of the cord 52, the cord 52, abutment element 53' and link 51 are returned to the position shown in FIG. 2.

Figure 2:
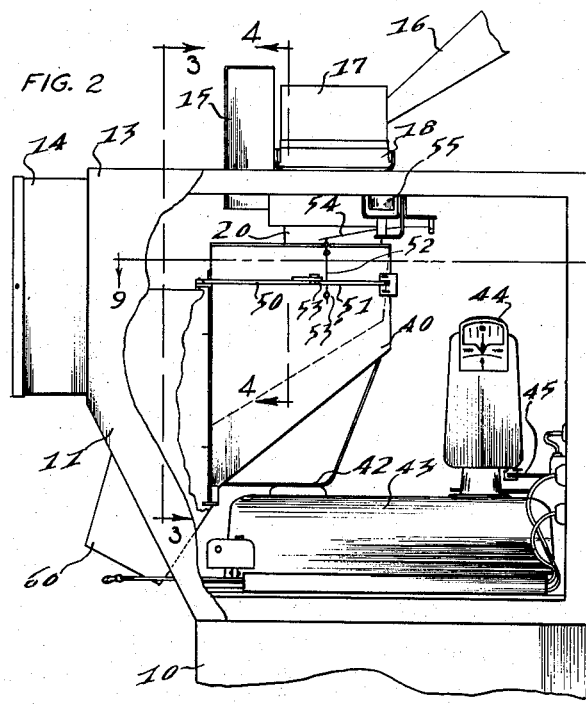
FIG. 2 is a larger scale side elevation partly broken away of the hopper and scale mechanism of that form of the present invention shown in FIG. 1.

For operating the cord 52, an operating solenoid 55 is mounted on housing 11 above link 51. The solenoid 55 includes a downwardly extending plunger which carries the central portion of a curved lever 54. The rear end of lever 54 is pivotally connected to the solenoid 55, as best seen in FIG. 2, and the forward end of lever 54 carries the upper end of cord 52. Upon energization of solenoid 55, the lever 54 is pivoted upwardly in a vertical plane and a clockwise direction as viewed in FIG. 2 to the position shown in FIG. 10, thus raising the cord 52 and causing the links 50 and 51, acting through bracket 49, to open door 47. Upon deenergization of the solenoid 55, the lever 54 is returned to its original position as seen in FIG. 2 and hence the door 47 is closed.

As will be hereinafter discussed, it will be understood that the opening of the front door of the compartment is timed with the movement of diverter gate 20 to divert the incoming material from such compartment to the other compartment, the door of which remains closed during the discharge of material from the companion compartment.

From the foregoing general discussion, it will be seen that in the operation of the device continuously flowing material is successively diverted by the gate 20 to be received by one or the other compartment and that as one compartment is filled with material diverted thereto by the gate 20, the companion compartment is opened to permit the discharge of the material therefrom. As indicated in FIG. 1 and FIG. 2, a discharge chute 60 is mounted to receive and direct the material emerging from the opened door of the compartment to be delivered to suitable containers adapted to be successively supplied thereunder by means not here illustrated.

Figure 12:
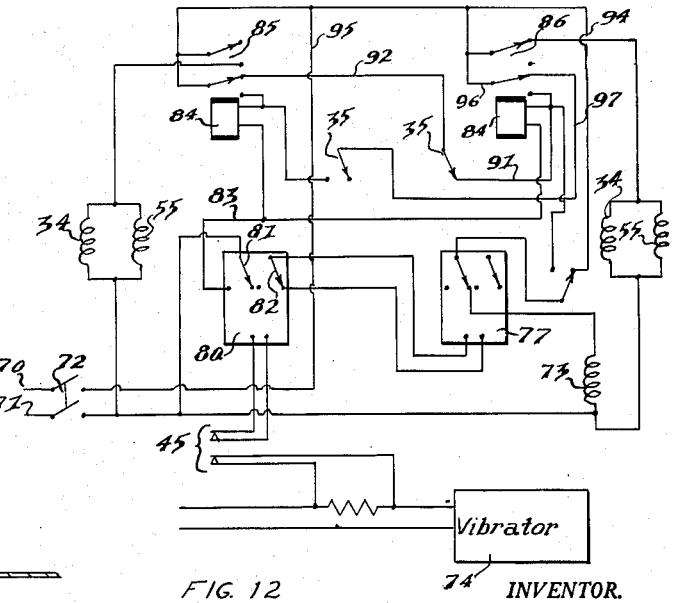
FIG. 12 is a wiring diagram of the electrical control circuit which may be used with the present invention.

In the operation of the device, it will be understood that a timing arrangement is provided through the electrical circuit depicted in FIG. 12. The circuit of FIG. 12 provides an input source of energy as indicated by the conductors 70 and 71 under the control of the main switch indicated at 72. The circuit herein presented is an illustration of a complete circuit for use with the commercial device of the present invention as now on the market. The circuit includes such devices as a bag conveyor latch solenoid 73 and vibrating means 74 and separate mass and dribble scale feed contacts 45 adapted to be operated by the scale mechanism. It will be understood however that these devices form no part of the present invention and have not been illustrated in the mechanical structure herein presented. The circuit for the purposes of the present structure may, therefore, be considered without reference to such devices. A wheel delay timer 77 is also included in the circuit and may be disregarded for consideration of the circuit with respect to the present mechanical mechanism. It may thus be assumed that for the present purposes, there is provided a timer device indicated at 80 which is actuated by suitable means by the scale mechanism to initiate an electrical control cycle. In the circuit here shown, the timer 80 includes a normally open left-hand contact 81 which is adapted to be closed when a proper load is received in one of the compartments and reflected by the scale mechanism through switches 45. The opposite contact 82 of the timer mechanism 80 controls the circuit of the wheel delay timer 77 and is not concerned with the present apparatus. When the scale is so operated as to close the contact 81, current is supplied from the conductor 71 through the contact 81 to a conductor 83 which leads to relays 84 controlling the right and left-hand doors 47, respectively. The door operation solenoids are indicated by the numerals 55 while the diverter solenoids are indicated at 34. The selection of rods of the solenoids 34 and 55 that are to be operated is controlled by the diverter switches indicated at 35. As here shown, the right-hand switch 35 is in closed position while the left-hand gate switch 35 is open. Thus when the timer energizes the conductor 83, current is delivered to the right hand relay 84 passing current therefrom through conductor 91, through closed right hand switch 35, through conductor 92 and thence to conductor 70 through normally closed switch 85. Thus the right-hand switch 86 will be closed to complete the circuit from conductor 71 to the right-hand door operating solenoid 55 and diverter solenoid 34. Such operation of the switch 86 also establishes contact between a conductor 96 and a conductor 97 leading to the left-hand diverter switch, thus providing a circuit to the opposite diverter switch which will automatically be closed upon the movement of the diverter while the switch 35 is open, thus terminating the energization to the right hand gate and door solenoids while establishing the opposite circuit through the relay 84 for closing the relay contacts and thus operating the opposite gate and door solenoids. It will be understood, however, that the timer mechanism will provide for the delay in the switching operation through which the relays 84 are successively energized.

From the foregoing, it will be seen that the present circuit provides for the scale control operation of the diverter from a position to fill one compartment to that of the other and that at the same time the solenoids will actuate to open the door of the compartment from which the diverter has been moved so that when the compartment is filled the door will be opened to discharge the material therein while the opposite compartment is being filled, the interval of time being adjustably controlled by the timer 80.

Hence, with the present apparatus and the circuit herein disclosed, it will be seen that the invention provides for a continual feed of material to the compartments and that the diverter will successively divert to filling of one compartment and then the other and that the door of the full compartment will be opened for the discharge of material while the companion compartment is being filled.

As indicated in FIGS. 2, 5, 6 and 10, the compartments may be adjusted as to capacity by the simple provision of compartment inserts which may be inserted in the top of the compartment. Each insert comprising a body 100 and being provided with a downwardly turned upper edge lip 101 which may be seated upon the top edge of the compartment. The compartment formed by the insert is of the general shape of the compartments 46 having a rear forwardly inclined back surface 102 and an open front 103 which is normally closed by the door as the compartment is being filled, the top of course is open to receive the material from the diverter gate.

As noted by the dotted lines of FIGS. 2 and 10, the bottom wall of the compartments when the inserts are installed is substantially higher than the normal bottom wall of the compartments hence the time of descent of chips from the hopper to the artificial bottom wall is reduced proportionately with the reduction in capacity. By this means the filling of smaller quantities of chips is speeded up by an amount equal to the reduction in dropping time of the chips, and accuracy is improved.

In consideration of the present invention, it will be understood that the invention is not limited nor confined to the specific structural details herein set forth and that numerous changes, modifications and the full use of equivalents may be resorted to in the practice of the invention without departing from the spirit or scope thereof as outlined in the appended claims.

I claim:

1. A weighing machine for weighing lightweight material comprising a hopper, a single weight responsive means, a pair of separate material compartments on said weight responsive means and below said hopper, a diverter for directing continuous supply of material from said hopper to said compartments successively, said diverter comprising a gate pivotally mounted to said hopper and movable beneath said hopper about a horizontal axis from an inclined position for directing material from said hopper to one compartment to an oppositely inclined position for directing material from said hopper to the other of said compartments, an operating bar connected to said gate and extending in a radial direction with respect to the axis of said gate, gate operating solenoid means connected to said hopper for pivoting said operating bar, a first switch means actuatable by said gate, circuits connected from said first switch means to said solenoid means, a second switch means responsive to said weight responsive means upon the accumulation of a predetermined amount of material in said compartments, a source of current connected to said first switch means and said second switch means whereby upon actuation of said second switch means current is supplied from said source of current to said solenoid means to shift the position of said gate, and means for discharging one compartment as said gate is deflecting material to the other compartment.

2. A weighing machine for weighing lightweight material comprising a hopper, a single weight responsive means, a pair of separate material compartments on said weight responsive means and below said hopper, a diverter for directing a continuous supply of material from said hopper to said compartments successively, said diverter comprising a gate pivotally mounted to said hopper and movable beneath said hopper about a horizontal axis from an inclined position for directing material from said hopper to one compartment to an oppositely inclined position for directing material from said hopper to the other of said compartments, a furcated operating bar connected to said gate and extending in a radial direction with respect to the axis of said gate, a double bell crank carried by said hopper, the central arm of said double bell crank being engaged at its extremity in the furcated portion of said operating bar, said bell crank being pivotally connected to said hopper, gate operating solenoids connected to said hopper on opposite sides of said central arm of said bell crank, plungers connected between the oppositely extending arms of said bell crank and said solenoids for pivoting said bell crank to oscillate said extremity of said central arm from a position to one side of said axis to another position on the other side of said axis upon actuation of one solenoid and deactuation of the other solenoid and vice versa, a pair of switches mounted on said hopper and alternately actuatable by said bell crank, circuits connected from said switches to said solenoids, switch means responsive to said weight responsive means upon the accumulation of a predetermined amount of material in said compartments, and a source of current connected to said switch means and each of said switches whereby current is supplied from said source of current through said switch means to one of said solenoids when one of said switches is actuated by said bell crank and said switch means is actuated and to the other of said solenoids when the other switch means is actuated by said bell crank and said switch means is actuated, each of said compartments defining hoppers, doors for said hoppers, door control means for alternately opening said doors to prevent material from said hoppers to discharge from said compartments, said door control means including individual door solenoids for operating said doors, and circuits connected between said first switch means and said door solenoids whereby current is simultaneously supplied to one of said gate operating solenoids and one of said door solenoids for the opening of the door of one compartment as said diverter directs material to the other compartment.

3. A weighing machine for weighing lightweight material comprising a hopper, a single weight responsive means, a pair of separate material compartments on said weight rseponsive means and below said hopper, a diverter for directing a continuous supply of material from said hopper to said compartments successively, said diverter comprising a gate pivotally mounted to said hopper and movable beneath said hopper about a horizontal axis from an inclined position for directing material from said hopper to one compartment to an oppositely inclined position for directing material from said hopper to the other of said compartments, a furcated operating bar connected to said gate and extending in a radial direction with respect to the axis of said gate, a double bell crank carried by said hopper, the central arm of said double bell crank being engaged at its extremity in the furcated portion of said operating bar, said bell crank being pivotally connected to said hopper, gate operating solenoids connected to said hopper on opposite sides of said central arm of said bell crank, plungers connected between the oppositely extending arms of said bell crank and said solenoids for pivoting said bell crank to oscillate said extremity of said central arm from a position to one side of said axis to another position on the other side of said axis upon actuation of one solenoid and deactuation of the other solenoid and vice versa, a first switch means actuatable by said bell crank, circuits connected from said switch means to said solenoids, a second switch means responsive to said weight responsive means upon the accumulation of a predetermined amount of material in said compartments, and a source of current connected to said first switch means and said second switch means whereby current is supplied from said source of current to one of said solenoids when said second switch means is actuated and said bell crank is in one position and to the other of said solenoids when said second switch means is actuated and said bell crank is in the other position.

4. A weighing machine for weighing lightweight material comprising a hopper, a pair of separate material compartments below said hopper, a diverter for directing a continuous supply of material from said hopper to said compartments successively, said diverter comprising a gate pivotally mounted to said hopper and movable about a horizontal axis from an inclined position for directing material from said hopper to one compartment to an oppositely inclined position for directing material from said hopper to the other of said compartments, a furcated operating bar connected to said gate and extending in a radial direction with respect to the axis of said gate, a double bell crank carried by said hopper, the central arm of said double bell crank being engaged at its extremity in the furcated portion of said operating bar, said bell crank being pivotally connected to said hopper, spring means connected between said hopper and said gate for urging said gate into both of its inclined positions, gate operating solenoids connected to said hopper on opposite sides of said central arm of said bell crank, plungers connected between the oppositely extending arms of said bell crank and said solenoids for pivoting said bell crank to oscillate said extremity of said central arm from a position to one side of said axis to a position on the other side of said axis upon actuation of one solenoid and deactuation of the other solenoid and vice versa, a first switch means actuatable by said bell crank, circuits connected from said first switch means to said solenoids, a second switch means responsive to the accumulation of a predetermined amount of material in said compartments, a source of current connected to said first switch means and said second switch means whereby current is supplied from said source of current to one of said solenoids when said second switch means is actuated and said bell crank is in one position actuating said first switch means and to the other of said solenoids when said second switch means is actuated and said bell crank is in the other position actuating said first switch means, vertically pivoted front doors for said hoppers, door control means for alternately opening said doors to prevent material from said hoppers to discharge forwardly from said compartments, and circuits connected between said first switch means and said door control means whereby current is simultaneously supplied to one of said gate operating solenoids and one of said door control means for the opening of the door of one compartment as said diverter directs material to the other compartment.

5. A weighing machine for weighing lightweight material comprising, a hopper, a pair of separate material compartments below said hopper, a diverter for directing a continuous supply of material from said hopper to said compartments successively, said diverter comprising a gate pivotally mounted to said hopper and movable about a horizontal axis from an inclined position for directing material from said hopper to one compartment to an oppositely inclined position for directing material from said hopper to the other of said compartments, a furcated operating bar connected to said gate and extending in a radial direction with respect to the axis of said gate, a double bell crank carried by said hopper, the central arm of said double bell crank being engaged at its extremity in the furcated portion of said operating bar, said bell crank being pivotally connected to said hopper, spring means connected between said hopper and said gate for urging said gate into both of its inclined positions, gate operating solenoids connected to said hopper on opposite sides of said central arm of said bell crank, plungers connected between the oppositely extending arms of said bell crank and said solenoids for pivoting said bell crank to oscillate said extremity of said central arm from a position to one side of said axis to a position on the other side of said axis upon actuation of one solenoid and deactuation of the other solenoid and vice versa, a first switch means actuatable by said bell crank, circuits connected from said first switch means to said solenoids, a second switch means responsive to the accumulation of a predetermined amount of material in said compartments, a source of current connected to said first switch means and said second switch means whereby current is supplied from said source of current to one of said solenoids when said second switch means is actuated and said bell crank is in one position actuating first switch means and to the other of said solenoids when said second switch means is actuated and said bell crank is in the other position actuating said first switch means, said compartments defining hoppers having a side, rear and inclined bottom walls, vertically pivoted front doors for said hoppers, door control means for alternately opening said doors to prevent material from said hoppers to discharge forwardly from said inclined bottom walls, said door control means including individual pairs of hinged links, one end of each pair being connected to one of said doors by an extending bracket fixed to said door, the other end of each link being fixed whereby pivotal movement therebetween will draw the door open, door solenoids for operating said doors, lost motion connection means for pivotally moving said links with respect to each other, and circuits connected between said first switch means and said door solenoids whereby current is simultaneously supplied to one of said gate operating solenoids and one of said door solenoids for the opening of the door of one compartment as said diverter directs material to the other compartment.

References Cited in the file of this patent

UNITED STATES PATENTS

| | | |
|---|---|---|
| 418,795 | Henry | Jan. 7, 1890 |
| 648,617 | Hoepner | May 1, 1900 |
| 895,524 | Weyant | Aug. 11, 1908 |
| 1,267,635 | Cox | May 28, 1918 |
| 2,019,502 | Osgood | Nov. 5, 1935 |
| 2,101,384 | Conbray | Dec. 7, 1937 |
| 2,166,484 | Carlson | July 18, 1939 |
| 2,275,331 | Weckerly | Mar. 3, 1942 |
| 2,525,225 | Karlovich | Oct. 10, 1950 |
| 2,605,990 | Peterson | Aug. 5, 1952 |
| 2,661,876 | Kindseth | Dec. 8, 1953 |